Sept. 19, 1950 R. SOMMA 2,523,157

VACUUM CUP RECORD-TRANSPORTING DEVICE

Filed March 19, 1946 2 Sheets-Sheet 1

Inventor
Raymond Somma
By Seymour, Earle + Nichols
Attorneys

Sept. 19, 1950 R. SOMMA 2,523,157
VACUUM CUP RECORD-TRANSPORTING DEVICE
Filed March 19, 1946 2 Sheets-Sheet 2
Fig. 4.
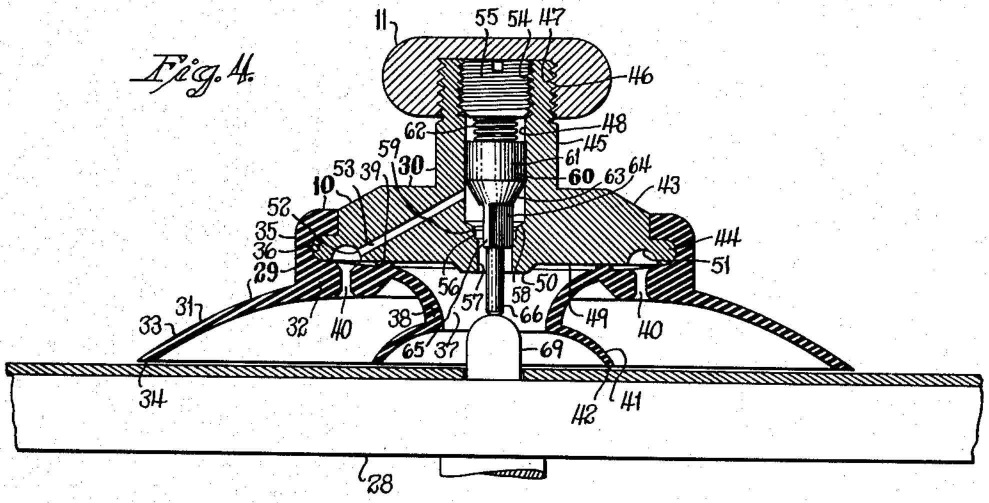
Fig. 6. Fig. 5.
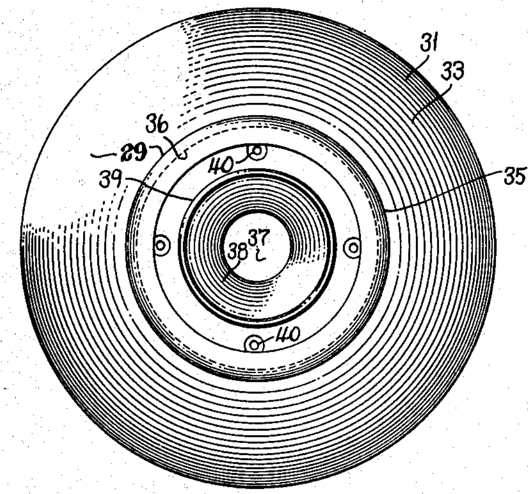
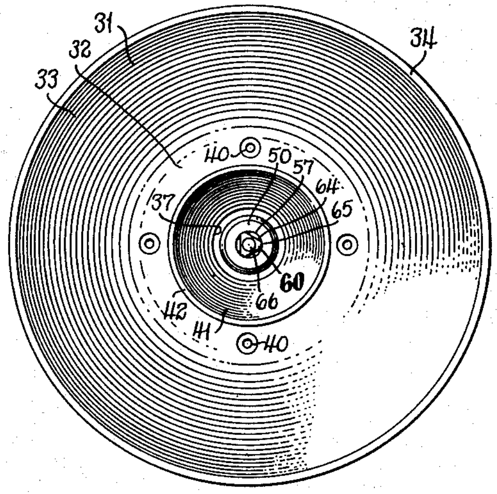
Fig. 7. Fig. 8.
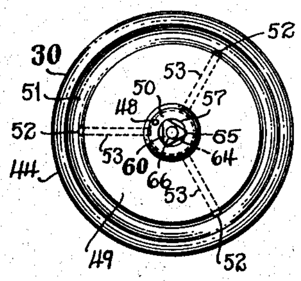
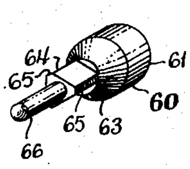
Inventor
By Raymond Somma
Seymour, Earle & Nichols
Attorneys Patented Sept. 19, 1950

2,523,157

UNITED STATES PATENT OFFICE 2,523,157

VACUUM-CUP RECORD-TRANSPORTING DEVICE

Raymond Somma, Waterbury, Conn.

Application March 19, 1946, Serial No. 655,470

8 Claims. (Cl. 274—1)

The present invention relates in general to phonographs and in particular to improved record-transporting mechanism for automatically transferring records from a supply source or magazine to the turntable of the phonograph.

Phonograph records are generally made in different sizes and are known to differ considerably in thickness. These factors are major problems, among others, in the design and operation of automatic mechanism for effecting the transfer of records. One of the more common types of transfer-means comprises two pairs of pivoted fingers which are adapted to support a stack of records at diametrically opposite points, and to drop the records successively onto the turntable, the delivery being made by simultaneously withdrawing the lower supporting-fingers from beneath the bottom record and inserting the upper fingers between the bottom record and the record immediately above to momentarily support the latter. Although used widely, it happens not infrequently that the upper fingers will fail to adjust themselves properly to variations in thickness of the records, and as a consequence will strike the edge of a record so as to chip or break it; or perhaps release one edge of the record only, thereby causing a jam.

An object of the present invention is the provision of improved mechanism for automatically delivering records safely and without the possibility of damage from a supply source or record-magazine, to the turntable of a phonograph.

A further object is to provide automatic mechanism which operates to transport records from a magazine to a turntable without regard to the size or thickness of successive records.

A still further object is to provide pneumatic means for successively lifting and transporting records from a magazine to a turntable and automatically releasing the records onto the turntable.

A still further object is to provide a record-transporting device embodying a vacuum cup and a vacuum cup releasing-valve assembly.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 4 is similar to Fig. 3 but after the vacuum cup and valve assembly have been swung into transfer position and released a record onto the turntable;

Fig. 5 is a plan view of the underside of the vacuum cup and valve assembly;

Fig. 6 is a plan view of the top of the vacuum cup;

Fig. 7 is a plan view of the underside of the valve; and

Fig. 8 is a perspective view of the valve member.

Figures 1, 2:
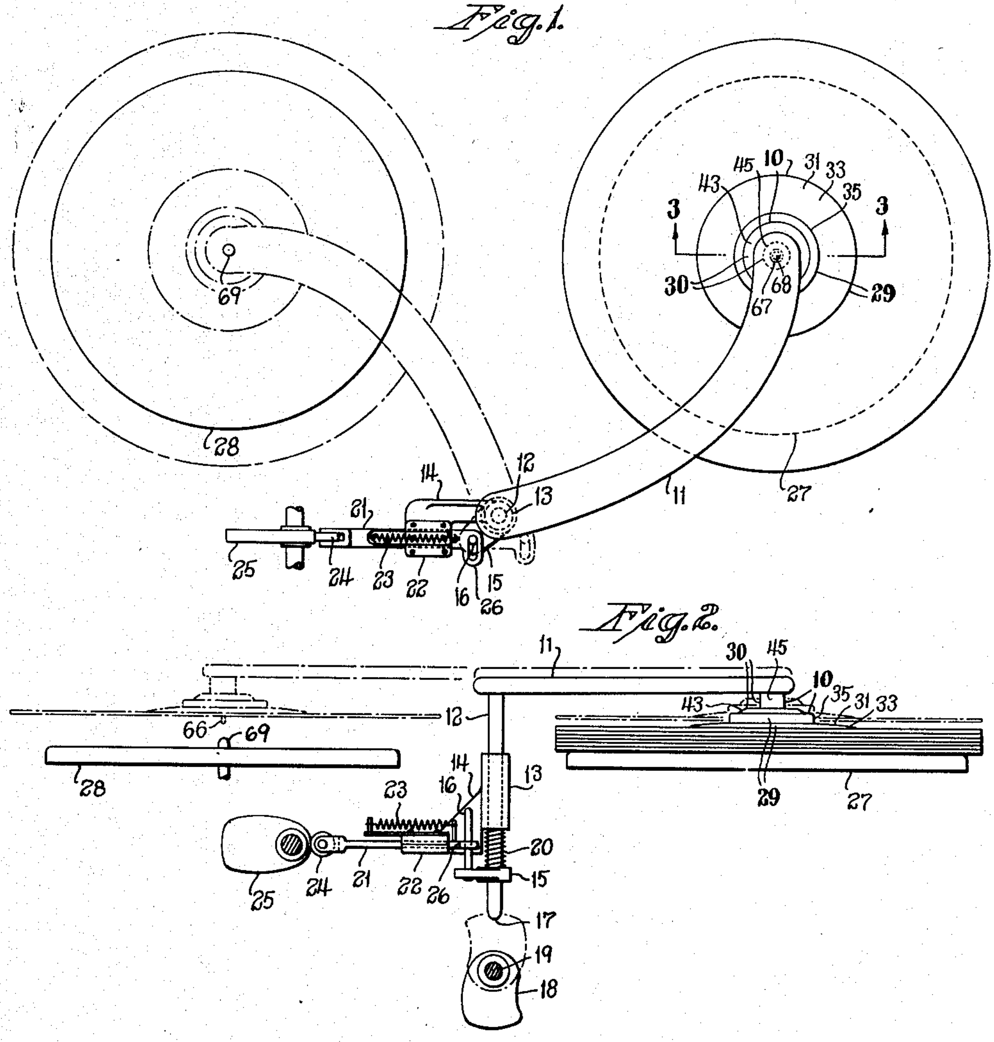
Fig. 1 is a plan view of the improved record-transporting device of this invention shown by full lines in its normal position and by broken lines in its transfer position including schematic mechanism for operating the transporting device.
Fig. 2 is a front elevation of the transporting device and operating mechanism shown in Fig. 1.

Referring to the drawings which illustrate one exemplary embodiment of the invention, the record-transporting means comprises a vacuum cup and valve assembly indicated generally at 10 and mechanism for moving the assembly through the record-transporting cycle. The latter mechanism is shown schematically in Figs. 1 and 2 and comprises a transfer-arm 11 on the outer end of which is mounted the vacuum cup and valve assembly 10. The opposite end of the arm 11 is fixedly secured to the upper end of an elevating-shaft 12 which is freely mounted in a sleeve-bearing 13 for both vertical and rotational movement therein. The sleeve-bearing 13 is shown as an integral part of a bracket 14 which may be secured to, or an integral part of, the frame of the phonograph. Keyed to the lower end of the shaft 12 below the sleeve 13 is a transversely-disposed crank-arm 15 having at its outer end a substantially-vertical fixed-pin 16. The lower extremity of the shaft has a radius 17 which is adapted to ride on the periphery of a lifting-cam 18 secured to a horizontally-disposed shaft 19, the latter being driven from a power source, not shown.

A coil-spring 20 is carried on the lower end of the shaft 12 and is engaged between the lower shoulder of the sleeve 13 and the upper surface of the crank-arm 15 to continuously urge the radius 17 of the shaft down into engagement with the periphery of the lifting-cam 18. The configuration of the cam 18 is such that, as the cam rotates, the shaft will be elevated abruptly, will remain in its elevated position for a predetermined dwell period, and thereafter be abruptly lowered by the force of the loaded-spring 20.

Acting in conjunction with the elevating-cam 18 is mechanism for rotating the shaft 12 and the transfer-arm 11 secured thereto. In the present embodiment the shaft-rotating means comprises a slide 21 mounted in substantially-horizontal fixed-ways 22, the slide being held in its normal retracted position by a coil tension-spring 23. The rear end of the slide is provided with a cam-roller 24 adapted to engage the periphery of a second cam 25. The forward end of the slide is provided with a short-slotted laterally-extending foot 26 adapted to receive the upright-pin 16 of the crank-arm 15. The configuration of the cam 25 is such that as it rotates, the spring-loaded slide 21 will first be advanced quickly to rotate the shaft 12 and transfer-arm 11 through an arc corresponding to the distance from the record-magazine to the turntable of the phonograph and in the present embodiment comprising substantially ninety degrees. The slide 21 and the transfer-arm 11 will then be held stationary during the dwell period of the cam, and thereafter the slide and transfer-arm will be returned to their normal positions by the force of the tensioned spring 23.

To provide the proper motion for the transfer-arm 11 during the record-transporting cycle, the elevating-cam 18 is driven at substantially twice the speed of the rotating-cam 25. Thus as the cam 18 raises the shaft 12 and transfer-arm 11, the cam 25 rotates the arm 11 and continues the rotation of the arm while the latter is being held in its elevated position by the dwell period of the cam 18 until the arm finally reaches its extreme left hand position, as shown in Fig. 1. At the end of its dwell period the elevating-cam 18 releases the shaft 12 whereupon the transfer-arm immediately drops downwardly a predetermined distance as determined by the configuration of the cam 18 during which interval the cam 25 provide a dwell period to preclude rotation of the transfer-arm. The end of the dwell period of the cam 25 coincides substantially with the next lifting cycle of the cam 18, whereupon the transfer-arm 11 is lifted up and swung back and lowered to its original or normal position thereby completing the record-transporting cycle. It will be noted that when the transfer-arm 11 is in its normal position as shown in Fig. 1, the elevating-cam 18 is out of engagement with the lower end of the shaft 12, the only support for the latter then being that provided by engagement of the vacuum cup and valve assembly 10 with the top record of the stack of records in the magazine, the latter being indicated generally at 27. That is to say, in its normal position the transfer-arm 11 is adapted to drop down freely in its sleeve-bearing 13 so as to lower the vacuum cup and valve assembly 10 directly on top of the uppermost record in the magazine 27, but when swung counter-clockwise through the record-transporting arc to its extreme left hand position (Fig. 1), the vacuum cup and valve assembly 10 will be lowered down to within a predetermined distance from the top of the record-supporting and rotating turntable indicated generally at 28, as determined by engagement at the lower end of the elevating-shaft 12 with the cam 18.

The lifting or picking up of successive records from the magazine and their subsequent release onto the turntable, is accomplished automatically by the vacuum cup and valve assembly 10 carried on the end of the transfer-arm 11.

Figure 3:
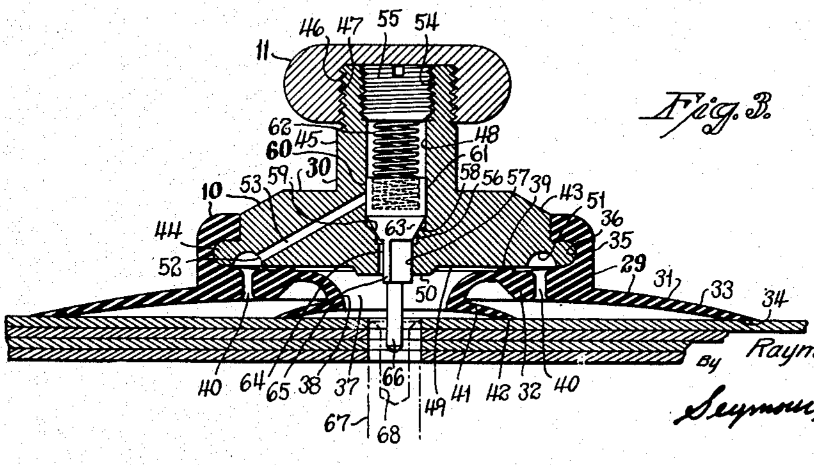
Fig. 3 is an enlarged sectional view of the vacuum cup and valve assembly on line 3—3 of Fig. 1.

Referring to Fig. 3, the vacuum cup and valve assembly 10 comprises in general a vacuum cup 29 and a valve 30. The vacuum cup 29 consists of an inverted saucer-shaped member 31 of rubber or a rubber-like material having a relatively-thick central disk- or base-portion 32, and a gradually tapering-rim section 33, the periphery of which constitutes a thin beveled edge 34. A relatively-thick rubber flange 35 is formed integrally on the top of the saucer-shaped member circumscribing the central disk- or base-portion 32, the interior wall of the flange being provided with an annular recess 36. An aperture 37 is provided in the center of the base-portion 32 and is defined by walls 38 which comprise a downwardly-converging throat which extends below the underside of the base-portion 32 of the saucer-shaped member 31. The upper and larger end of the central aperture 37 is circumscribed by an annular rib 39 semicircular in cross section and formed integrally on top of the base-portion 32. Located at circumferentially-equally-spaced points in the base-portion 32 of the vacuum cup, are a plurality of relatively-small holes 40, four being shown in the present embodiment (see Figs. 5 and 6) which are adapted to form air-passages between the upper and lower surfaces of the central disk- or base-portion 32 of the vacuum cup. Formed integrally at the lower end of the downwardly-converging walls 38 or throat of the central aperture, is an air-seal which in the present embodiment comprises an inverted saucer-shaped flange 41. The latter is substantially one-third the diameter of the periphery 34 of the vacuum cup 29, and of relatively-thin cross section, the periphery of the air-sealing flange 41 being provided with a flat beveled edge 42 which lies in a plane of the bevel-edge 34 of the vacuum cup 29.

The valve 30 which is used in conjunction with the vacuum cup 29 comprises a light metal disk provided on its upper edge with a bevel 43 and on its lower edge with an annular rib 44 of semicircular cross section, the dimensions of which correspond substantially to those of the annular recess 36 in the rubber flange 35 of the vacuum cup, it being the function of the annular rib 44 to fit securely within the annular recess of the rubber flange 35 to hold the valve 30 and the vacuum cup 29 in assembled relationship, as shown in Figs. 3 and 4.

The valve or metal disk 30 is provided on its upper surface with a centrally-disposed upwardly-projecting stud 45 threaded exteriorly as at 46, so as to be screwed into a threaded aperture 47 in the outer end of the transfer-arm 11. The stud 45 has an axial aperture indicated generally at 48 which extends down through the disk 30 to the underside 49 thereof. A relatively-short apertured-boss 50 extends downwardly from the underside 49 of the disk 30 concentric with its axial aperture 48; and adjacent the outer rim of the disk 30 is an annular groove or recess 51 also formed on the underside 49 of the disk. As shown in Fig. 7, a plurality of small holes 52 are provided at substantially-equally-spaced points in the distal-recess 51 which communicate by corresponding passages 53 in the valve 30 with the axial aperture 48 of its stud 45. When the valve 30 is assembled to the vacuum cup as described above, the annular groove 51 of the disk 30 is disposed substantially opposite the holes 40 in the base of the suction cup, and in this manner a continuous air-passage is provided from the underside of the vacuum cup 29 to the interior of the apertured-stud 45. The axial aperture 48 is shown provided at its upper end with a threaded counterbore 54 adapted to receive an exteriorly threaded screw-plug 55. The lower end of the aperture 48 is reduced in diameter by successive concentric constrictions 56 and 57 respectively, the upper constriction 56 forming with the lower end of the aperture 48 a shoulder 58 which is provided with an annular beveled surface constituting a valve-seat 59. The shoulder between the upper and lower constrictions 56 and 57 is substantially square. As shown in Figs. 3 and 4, the constriction 57 corresponds to and is coextensive with the aperture of the boss 50. It will be noted that the passages 53 formed in the body of the disk 30 and connecting the distal groove 51 on the underside thereof with the axial aperture 48 of the stud 45, intersect the walls of the aperture 48 at a point therein above the valve-seat 59.

Supported within the aperture 48 of the stud, is a valve-member 60 (see Figs. 3, 4 and 8) having a cup-shaped head-portion 61 adapted to receive the lower end of a suitable coil-spring 62 and provided with a frusto-conical shoulder 63, the angle of taper of which corresponds to the slope of the beveled valve-seat 59 so as to make a substantially air-tight seal therewith. Extending below the shoulder 63 is a valve-stem 64 which is of reduced diameter and substantially triangular in cross section, the longitudinal intersecting edges 65 of which are substantially-cylindrical surfaces adapted to make a smooth running fit in the lower constriction 57 of the aperture 48, as shown in Fig. 7. A pin 66 of relatively-small diameter extends below the lower end of the valve-stem 64, for purposes hereinafter described. In its assembled position in the apertured stud 45 of the valve, the frusto-conical shoulder 63 of the valve-member 60 is normally held down on the valve-seat 59 by the force of the compressed coil-spring 62, the latter being securely held in the cup-portion 61 of the valve-member by the screw-plug 55. In the normal position of the valve-member 60, its cup-portion 61 effectively covers the holes formed in the wall of the axial aperture 48 by the passages 53, and the pin 66 extends well below the underside of the disk and is adapted to be engaged and pushed upwardly against the force of the compressed spring 62, so as to lift the conical-shoulder 63 of the valve-member off of the valve-seat 59. When the valve is so lifted, the holes in the wall of the axial aperture 48 formed by the passages 53, will be uncovered by the cup-portion 61 of the valve-member as shown clearly in Fig. 4, thus permitting air to pass up through the axial aperture 48 of the valve-stud 45 into the annular space between the valve-seat 59 and the frusto-conical shoulder 63; and from thence down through the passages 53 into the space beneath the saucer-shaped section 31 of the vacuum cup to effectively destroy a vacuum therein.

The above described record-transporting mechanism is adapted to be used in conjunction with a record-magazine 27 and turntable 28 of a phonograph. For the purpose of illustration, the record-magazine 27 may comprise a suitable well provided within the phonograph and adapted to receive a plurality of records arranged in superposed relationship and supported on resilient means adapted to feed successive records upwardly into position to be engaged by the vacuum cup and valve assembly 10, as shown in Figs. 2 and 3. In this connection it will be noted that the record-centering post 67 of the magazine (Fig. 3), is provided at its upper end with an axial recess 68 adapted to receive the depending-pin 66 of the valve so as to prevent displacement of the valve-member from its seat when the vacuum cup is brought down onto the top record in the magazine, in the manner described above. Thus, as the vacuum cup 29 moves down onto the top record, the air-sealing flange 41 of the cup circumscribes the central aperture of the record and, in conjunction with the annular rubber-rib 39 which tightly engages the underside of the valve-element 30, effectively seals off the vacuum cup 29 from air which might enter through the central aperture of the record. Thus a vacuum is created beneath the saucer-shaped rim-section 33 of the vacuum cup which suffices to lift the top record up out of the magazine as the transfer-arm moves upwardly. When the transfer-arm 11 has carried the vacuum cup and the record which is adhering thereto over to the turntable 28, the arm 11 will be moved downwardly in the manner described above, and as the vacuum cup and valve assembly approach the top of the turntable, the pin 66 of the valve strikes the top of the turntable record-centering post 69. Thereupon, the pin 66 will be moved upwardly, thereby lifting the valve-member 60 off of its seat and permitting air to pass up into the passages 53 and break the vacuum, whereupon the record drops down immediately onto the turntable. The transfer-arm then returns to its normal position carrying the vacuum cup and valve assembly back for engagement with the next succeeding record in the magazine. By properly regulating the speed of rotation of the cam-shafts, the time required for satisfactorily transporting a record from the magazine to the turntable may be of the order of two to two and one-half seconds, which is an exceptionally and unusual fast rate of transfer, and one which is characterized moreover by a safe and dexterous handling of records, such as to preclude any possibility of damage thereto irrespective of their size or thickness.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In an automatic phonograph, the combination with a record-magazine and a turntable for supporting and rotating records, said turntable having a centering-post; of means for transporting a record from the magazine to the turntable comprising a record pick-up device constructed and arranged to adhere to the top surface of a record in said magazine; a pick-up supporting member arranged to move said pick-up device into engagement with the topmost record of said magazine and from said magazine to a position above said turntable; and an adherence-controlling element associated with said pick-up device constructed and arranged to engage and to be actuated by the centering-post of said turntable when said pick-up device is positioned above said turntable to break the adherence between said pick-up device and said record thereby to release the record engaged thereby onto said turntable.

2. In an automatic phonograph, the combination with a record-magazine and a turntable for supporting and rotating records, said turntable having a centering-post; of means for transporting a record from the magazine to the turntable comprising a vacuum cup constructed and arranged to adhere to the top surface of a record in said magazine to pick up a record therefrom; a vacuum-cup supporting-member arranged to move said vacuum cup into engagement with the topmost record of said magazine and from said magazine to a position above said turntable; and a vacuum controlling element carried by said vacuum cup constructed and arranged to engage and to be actuated by the centering-post of the turntable when said vacuum cup is positioned above the said turntable to break the vacuum of said cup thereby to release the record engaged thereby onto said turntable.

3. In an automatic phonograph, the combination with a record-magazine and a turntable for supporting and rotating records, said turntable having a centering-post; of means for transporting a record from the magazine to the turntable comprising a vacuum cup and valve assembly said vacuum cup being arranged to adhere to the top surface of a record in said magazine to lift up a record therefrom; a vacuum-cup supporting-transfer-arm arranged to move said vacuum cup and valve assembly into engagement with the topmost record of said magazine and from said magazine to a position above said turntable; and a valve-member mounted in the valve assembly arranged to engage the centering-post of said turntable when said pick-up device is positioned above said turntable to automatically break the vacuum of said cup thereby to release the record engaged thereby onto said turntable.

4. An automatic record-transporting device for phonographs having a record-magazine and a turntable provided with a centering-post, said device comprising a vacuum cup arranged to engage and to adhere to the top surface only of a record concentric with the central aperture thereof to pick up and transport a record from said magazine to the turntable, said vacuum cup having a central aperture, an upstanding flange concentric with said central aperture and circumferentially-spaced apertures at the base of and within the compass of said flange; a sealing-flange on the underside of said vacuum cup integral therewith and concentric with said central aperture arranged to engage said record to seal off said vacuum cup from the central aperture of said record; a valve-element constructed and arranged to be secured to said vacuum cup by engagement with said upstanding flange, said valve-element having an axial aperture and radially-disposed passages connecting said axial aperture with the circumferentially-spaced apertures of said vacuum cup; and a valve-member resiliently mounted in said axial aperture and arranged normally to close said axial aperture to seal off said vacuum cup therefrom and to be actuated by engagement with said centering-post when said record is over said turntable to open said vacuum cup to said axial aperture so as to break the vacuum of said cup and release the record onto said turn-table.

5. An automatic record-transporting device for phonographs having a record-magazine and a turntable provided with a centering-post, said device comprising a rubber vacuum cup arranged to engage and to adhere to the top surface of a record concentric with the central aperture thereof to pick up and transport a record from said magazine to the turntable, said vacuum cup having a central aperture, an upstanding integral rubber flange provided with an annular recess concentric with said central aperture and circumferentially-spaced apertures at the base of and within the compass of said flange; a sealing flange on the underside of said vacuum cup integral therewith and concentric with said central aperture arranged to engage said record to seal off said vacuum cup from the central aperture of said record; a valve-element having a rim-portion arranged to be engaged in the annular recess of said upstanding flange to secure said valve-element to said vacuum cup said valve-element having an axial aperture provided with a valve-seat and radially-disposed passages connecting said axial aperture with the circumferentially-spaced apertures of said vacuum cup; a valve-member mounted in said axial aperture; and a coil-spring in said axial aperture arranged normally to hold said valve-member on said valve-seat to seal off said vacuum cup from said axial aperture said valve-member being arranged to be lifted from said valve seat by engagement with said centering-post when said record is over said turntable to open said vacuum cup to said axial aperture so as to break the vacuum of said cup and release the record onto said turntable.

6. In an automatic phonograph having a record-magazine and a turntable provided with a centering-post for supporting and rotating records; means for transporting a record from said magazine to said turntable comprising a vacuum cup and valve assembly, said vacuum cup being arranged to adhere to the top surface only of a record in said magazine to pick up a record therefrom; an arm; fastening-means arranged to rigidly secure said vacuum-cup to said arm; a pivotal-element arranged to support said arm; drive-means constructed and arranged to engage and elevate said pivotal-element to move said arm and said vacuum cup through a predetermined record-transporting cycle; and a valve-member mounted in the valve assembly constructed and arranged to be actuated by engagement with said centering-post when a record is opposite said turntable to break the vacuum of said cup thereby to release the record engaged thereby onto said turntable.

7. In an automatic phonograph, the combination with a record-magazine and a turntable for supporting and rotating records, said turntable having a centering-post; of means for transporting the record from the magazine to the turntable comprising a vacuum-cup and valve assembly, said vacuum-cup being arranged to adhere to the top surface of a record in said magazine to lift up a record therefrom; a vacuum-cup-supporting-and-transfer arm arranged to support said vacuum-cup and valve assembly; drive-means arranged to move said transfer-arm through a predetermined record-transporting cycle such that said vacuum-cup and valve assembly is moved initially into engagement with the topmost record of said magazine and from thence to a position above said turntable; and a valve-member mounted in the valve assembly arranged to engage and to be actuated by the centering-post of said turntable when said vacuum-cup is positioned above the said turntable to break the vacuum of said vacuum-cup thereby to release the record engaged thereby onto said turntable.

8. In an automatic phonograph, the combination with a record-magazine and a turntable for supporting and rotating records, said turntable having a centering-post; of means for transporting a record from the magazine to the turntable, said record-transporting means comprising a vacuum-operated record-pickup device embodying an annular outer seal, a concentric inner seal and air-passages communicating between said outer and inner seals; a pickup-device supporting-member arranged to move said pickup-device into engagement with the topmost record of said magazine and from said magazine to a position above the said turntable; and a valve-element associated with said pickup-device, said valve-element being arranged normally to close off the air-passages communicating between said outer and inner seals so as to provide a vacuum therebetween for lifting a record, said valve-element being arranged to engage and to be displaced by the centering-post of said turntable when said pickup-device is positioned thereabove thereby to open the air-passages communicating between said outer and inner seals so as to break said vacuum and thereby release the record supported by the pickup-device onto said turntable.

RAYMOND SOMMA.

REFERENCES CITED

The following references are of record in the file of this patent:

UNITED STATES PATENTS

| Number | Name | Date |
|---|---|---|
| 2,342,411 | Lissiansky | Feb. 22, 1944 |
| 2,386,166 | Lissiansky | Oct. 2, 1945 |

FOREIGN PATENTS

| Number | Country | Date |
|---|---|---|
| 710,187 | France | June 1, 1931 |